(12) United States Patent
Nishi et al.

(10) Patent No.: US 7,221,476 B2
(45) Date of Patent: May 22, 2007

(54) PICTURE IMAGE PROCESSING APPARATUS AND METHOD, AND PICTURE PROCESSING SYSTEM

(75) Inventors: Noriyuki Nishi, Naga-gun (JP); Hisakazu Kuramoto, Izumisano (JP); Shoichi Dedachi, Wakayama (JP); Keiji Nakano, Nagoya (JP)

(73) Assignee: Noritsu Koki Co., Ltd., Wakayama-shi (JP)

( * ) Notice: Subject to any disclaimer, the term of this patent is extended or adjusted under 35 U.S.C. 154(b) by 1044 days.

(21) Appl. No.: 10/162,110

(22) Filed: Jun. 5, 2002

(65) Prior Publication Data
US 2002/0191204 A1    Dec. 19, 2002

(30) Foreign Application Priority Data
Jun. 7, 2001    (JP)    ............................. 2001-172954

(51) Int. Cl.
  *G06F 15/00*    (2006.01)
  *H04N 1/60*     (2006.01)
  *G03F 3/08*     (2006.01)

(52) U.S. Cl. ........................ 358/1.9; 358/520; 358/448; 358/519; 358/518; 358/461; 358/521; 358/523; 358/522; 382/162; 382/167; 382/168; 345/673

(58) Field of Classification Search ................ 345/673; 358/1.9, 520, 448, 516, 518, 461; 382/162, 382/167, 168
See application file for complete search history.

(56) References Cited

U.S. PATENT DOCUMENTS

| | | | |
|---|---|---|---|
| 4,792,847 A | | 12/1988 | Shimazaki et al. |
| 5,719,540 A | | 2/1998 | Takaoka et al. |
| 5,724,456 A | | 3/1998 | Boyack et al. |
| 5,798,842 A | * | 8/1998 | Yamazaki .................... 358/302 |
| 6,023,524 A | * | 2/2000 | Yamaguchi .................. 382/162 |
| 6,026,216 A | * | 2/2000 | Ohtsuka et al. .............. 358/1.9 |
| 6,038,011 A | * | 3/2000 | Ikenoue et al. ............... 355/40 |
| 6,229,580 B1 | | 5/2001 | Inoue |
| 6,393,148 B1 | * | 5/2002 | Bhaskar ....................... 382/169 |
| 6,445,816 B1 | * | 9/2002 | Pettigrew .................... 382/162 |

(Continued)

FOREIGN PATENT DOCUMENTS

EP    0 701 362 A    3/1996

(Continued)

*Primary Examiner*—Aung S. Moe
*Assistant Examiner*—Beniyam Menberu
(74) *Attorney, Agent, or Firm*—Smith Patent Office

(57) ABSTRACT

A picture image processing apparatus is provided with a hue calculating portion for calculating a hue pixel by pixel based on RGB data, a first sampling portion for sampling pixels having a hue corresponding to a skin color from the RGB data, a first characteristic quantity calculating portion for calculating a first characteristic quantity representing a characteristic of the RGB data of the pixels, a second sampling portion for sampling the pixels located in a central part of an image area, a second characteristic quantity calculating portion for calculating a second characteristic quantity representing the RGB data of the pixels sampled by the second sampling portion, a correction amount calculating portion for calculating a density correction amount using the first and second characteristic quantities, and a density correcting portion for correcting the density of the RGB data. The density of a main subject in the image can be properly corrected.

8 Claims, 8 Drawing Sheets

U.S. PATENT DOCUMENTS

| | | | |
|---|---|---|---|
| 6,473,198 B1 * | 10/2002 | Matama | 358/1.9 |
| 6,535,301 B1 * | 3/2003 | Kuwata et al. | 358/1.9 |
| 6,563,602 B1 * | 5/2003 | Uratani et al. | 358/1.9 |
| 6,975,437 B2 * | 12/2005 | Takemoto | 358/518 |
| 6,996,270 B1 * | 2/2006 | Ito | 382/167 |
| 7,034,959 B1 * | 4/2006 | Takemoto | 358/1.9 |

FOREIGN PATENT DOCUMENTS

| | | |
|---|---|---|
| EP | 1 126 410 A | 8/2001 |
| JP | 7-182479 A | 7/1995 |
| JP | 10-198795 A | 7/1998 |

* cited by examiner

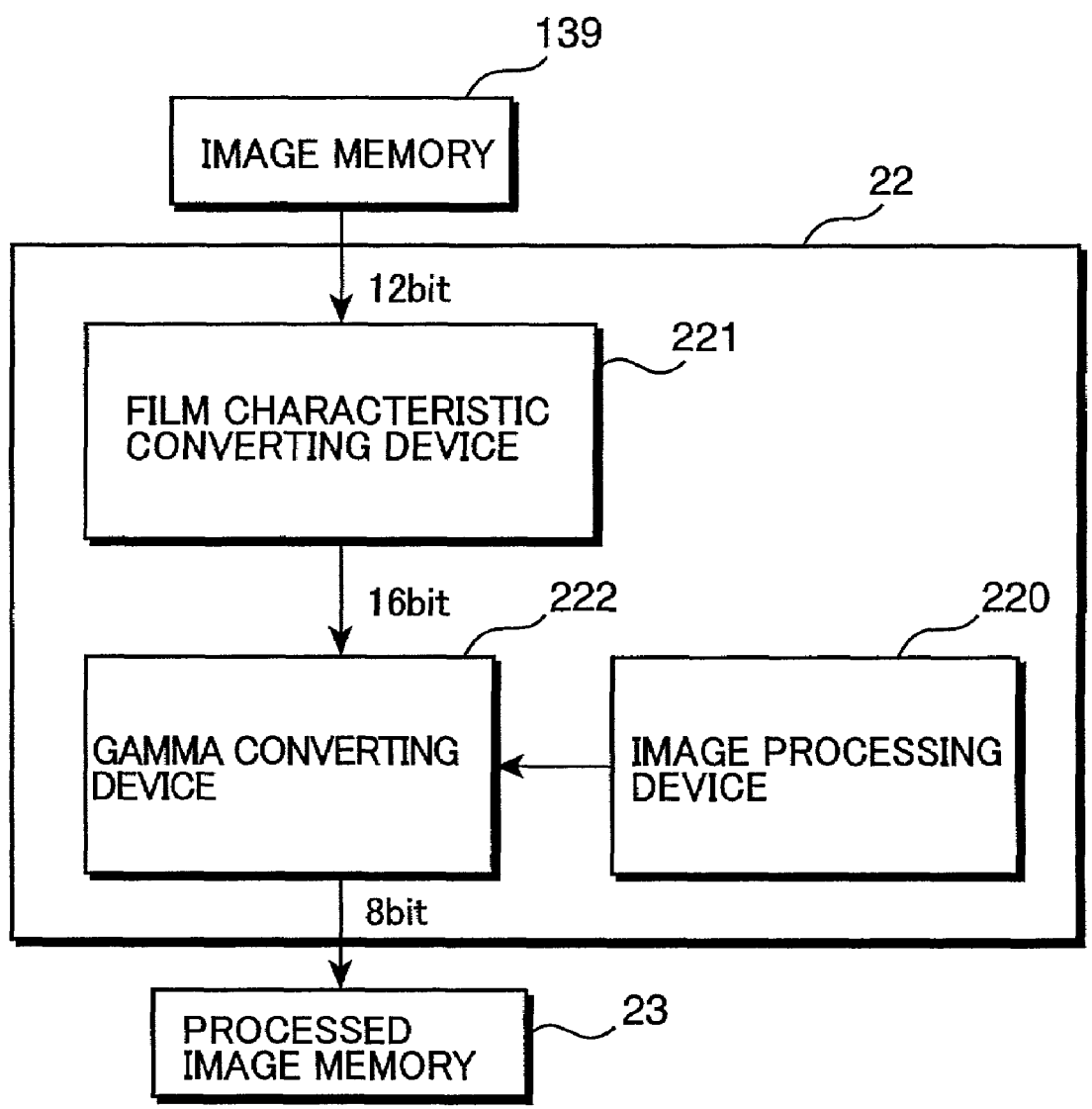

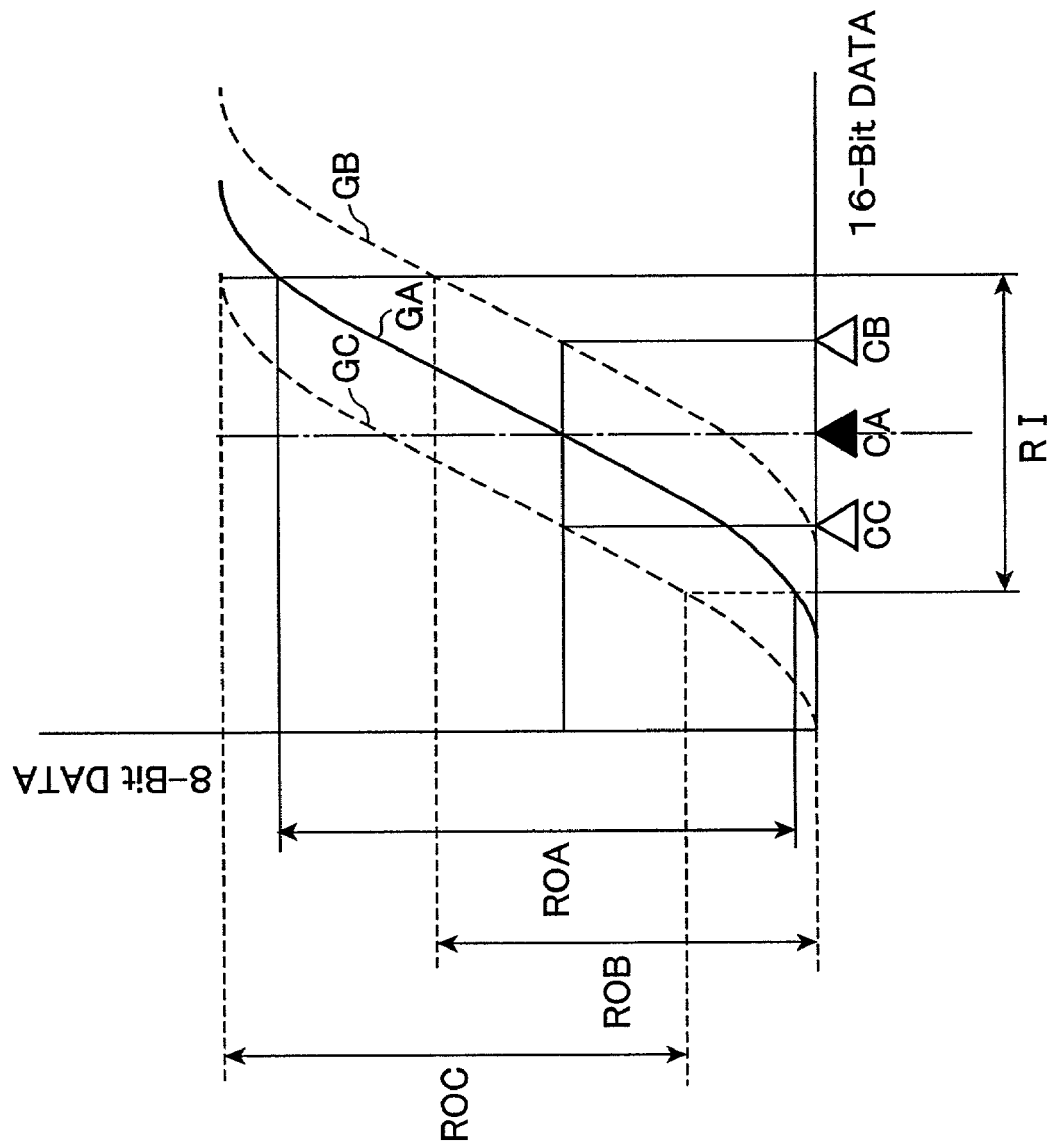

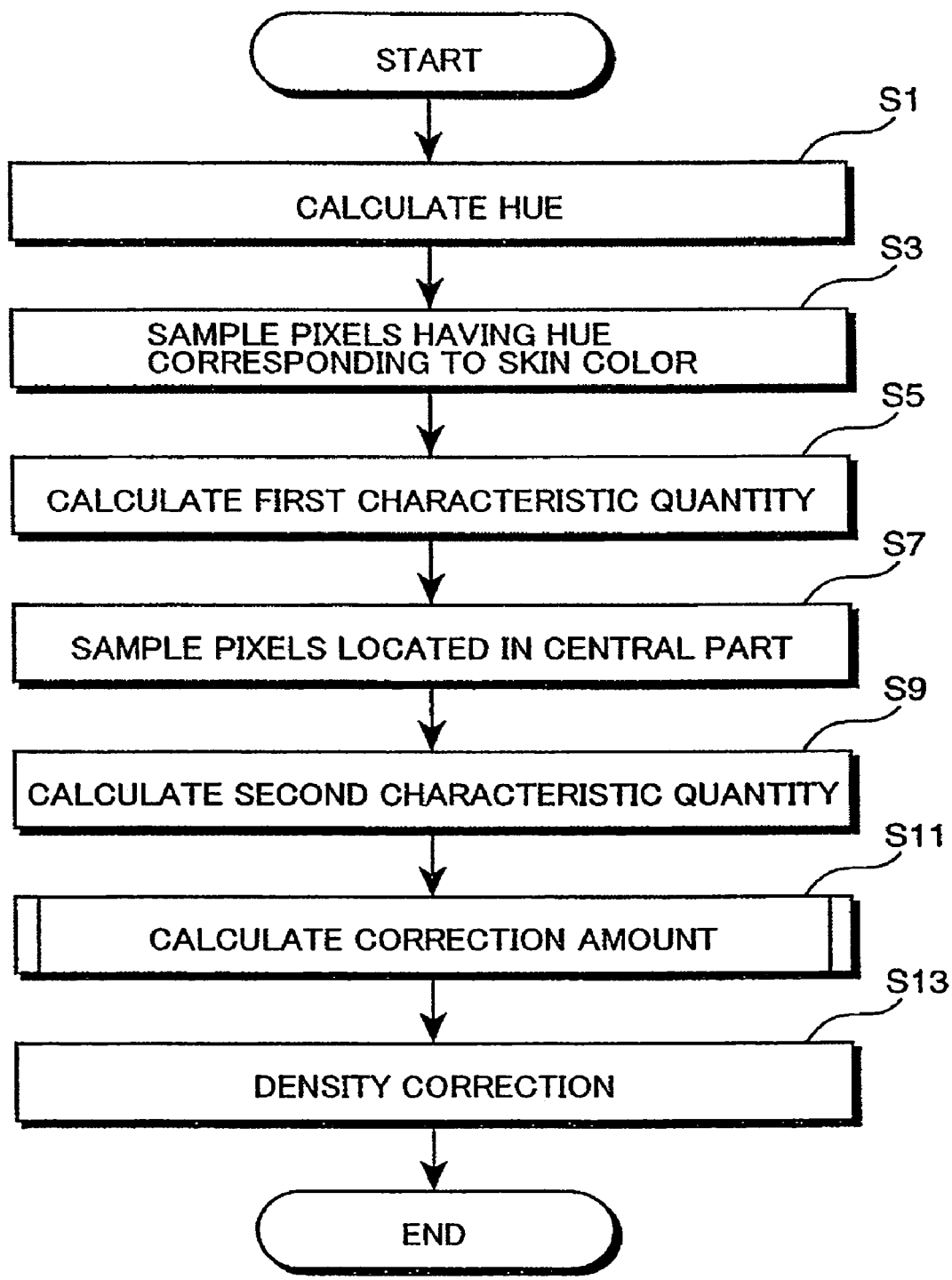

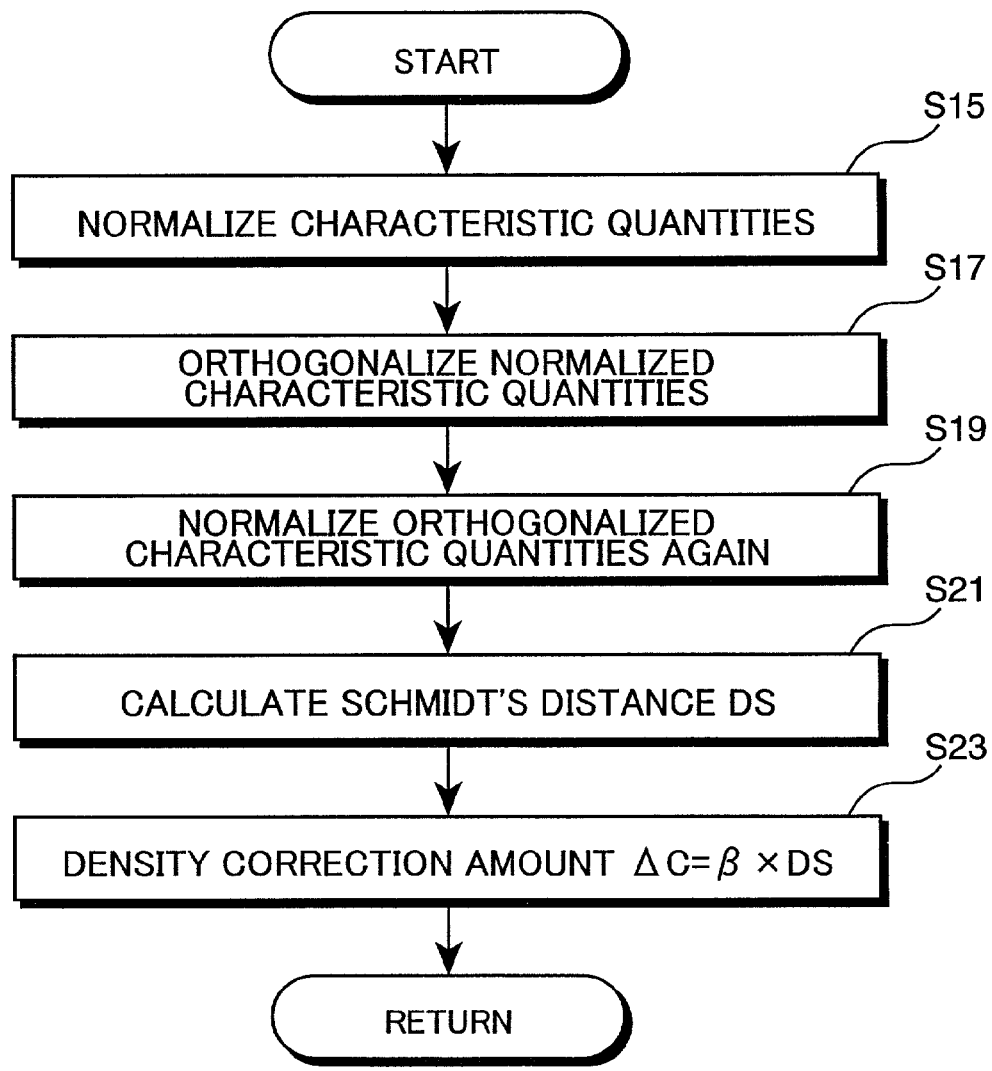

PICTURE IMAGE PROCESSING APPARATUS AND METHOD, AND PICTURE PROCESSING SYSTEM

BACKGROUND OF THE INVENTION

This invention relates to a technique of correcting digital image data obtained by a scanner or a digital camera such that, particularly, a main subject has a proper density.

There is known an apparatus provided with a function of enabling a density correction to adjust the density of an outputted image, particularly main subject, to a proper level in the case of outputting a digital image obtained by a scanner or a digital camera to a monitor, a printer or the like.

A known method for this density correction is such that an average value of the density of the entire image data is obtained for each of the respective color components of R (red), G (green), B (blue) of the digital image data, and histograms of the respective color components R, G, B are corrected such that the density average values coincide with density reference values set beforehand.

In the case that the density correction is applied by the above method to an image having a skewed density distribution in the entire image such as an image obtained by photographing a human figure as a main subject against a bright background without using a flash device or an image obtained by photographing a human figure as a main subject against a dark background using a flash device, there has been a problem that the density of the human figure as the main subject cannot be properly corrected by being influenced by the background.

For instance, image data obtained by photographing a human figure as a main subject against a dark background using a flash device has a large density average value. Thus, if the density correction is applied to this image data by the above method, such a density correction as to reduce the entire density is applied, which makes the density of the human figure as the main subject excessively low. As a result, an output image having a proper density cannot be obtained.

SUMMARY OF THE INVENTION

It is an object of the present invention to provide a picture image processing apparatus and method, and a picture processing system which are free from the problems residing in the prior art.

According to an aspect of the present invention, RGB data is obtained by separating a photographed film image into color components of R, G and B, and is stored pixel by pixel in a storage portion. A hue for each pixel is calculated based on the RGB data. Pixels having a hue corresponding to a skin color is sampled from the RGB data. A first characteristic quantity representing a characteristic of the RGB data of the sampled pixels is calculated. Next, pixels located in a central part of an image area is sampled. It is performed to calculate a second characteristic quantity representing a characteristic of the RGB data of the sampled pixels. A density correction amount is calculated using the first and second characteristic quantities. A density correction is applied to the RGB data using the calculated density correction amount.

These and other objects, features, aspects, and advantages of the present invention will become more apparent from the following detailed description of the preferred embodiments/examples with reference to the accompanying drawings.

BRIEF DESCRIPTION OF THE DRAWINGS

FIG. 2 is a construction diagram of an essential portion of a processing unit provided in the system;

FIG. 4 is a graph showing an operation performed by an image processing device;

FIG. 8 is a flowchart showing a procedure of operations performed by the image processing device;

FIG. 9 is a table showing a group of first characteristic quantities and a group of second characteristic quantities to which Schmidt orthogonalization is to be applied; and FIG. 10 is a flowchart showing a detailed operation of calculating a density correction amount.

DETAILED DESCRIPTION OF THE PREFERRED EMBODIMENTS OF THE INVENTION

Figure 1:
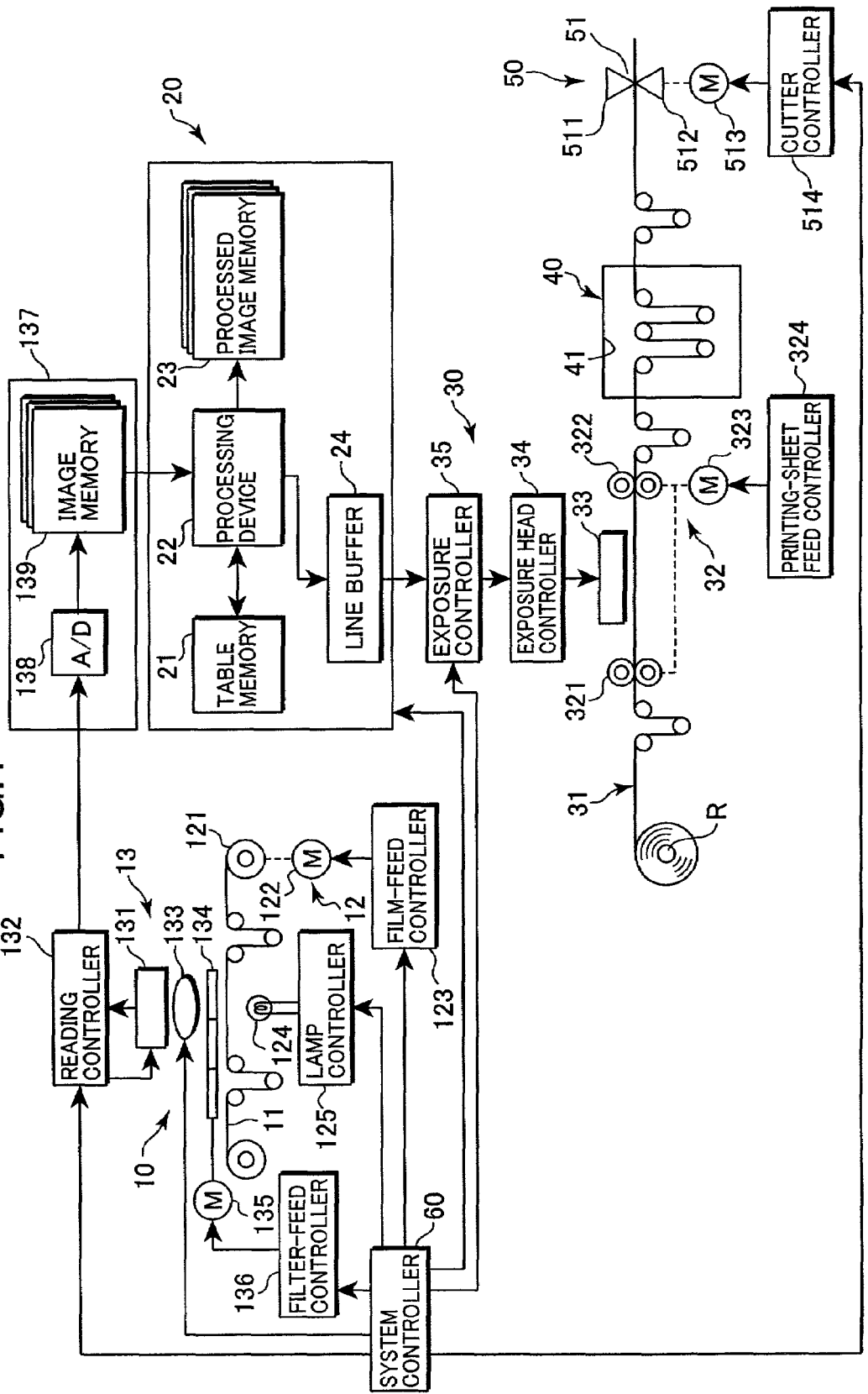
FIG. 1 is a schematic construction diagram of a picture processing system according to an embodiment of the present invention.

Referring to FIG. 1, a picture processing system is provided with a RGB data reading unit 10 for reading images from a positive film and storing them in a memory, an image data processing unit 20 for applying specified data processings and image editing to the RGB data read by the RGB data reading unit 10, an image exposing unit 30 including an image exposure head for converting the RGB data to which the data processing and/or the image editing were applied into light signals and exposing a printing sheet thereby, a developing unit 40 for developing the exposed printing sheet, a cutting unit 50 for cutting the dried printing sheet frame by frame, and a system controller 60 for controlling the operation of the entire system.

The RGB data reading unit 10 includes a film feeder 12 for feeding the respective frames of a developed film 11 to a reading position and an image reader 13 for reading images in the respective frames of the film 11.

The film feeder 12 is provided with a take-up roller 121, a drive motor 122 for rotating the take-up roller 121, a film-feed controller 123 for controlling the driving of the drive motor 122, a lamp 124 arranged below the film 11 and used as a light source, and a lamp controller 125 for controlling an amount of light emitted from the lamp 124. The drive motor 122 is rotated in accordance with a control signal from the film-feed controller 123 to intermittently feed the film 11 by a distance equal to the length of the frame by means of the take-up roller 121, thereby causing the respective frames to successively face the lamp 124.

The image reader 13 is provided with an image sensing device 131 comprised of CCDs arrayed in a matrix for reading the images in the respective frames of the film 11, a reading controller 132 for controlling the reading of the images by the image sensing device 131, a lens 133 for focusing an image in each frame of the film 11 on a light-receiving surface of the image sensing device 131, an optical film 134 insertable between the film 11 and the lens 133 for separating the images of the film 11 into three color components of R, G, B, a filter drive motor 135 for moving the position of the optical filter 134, a filter controller 136 for controlling the driving of the filter drive motor 135, and a storage device 137 for storing image signals picked up by the image sensing device 131.

The storage device 137 includes an analog-to-digital (A/D) converter 138 for converting the analog image signal picked up by the image sensing device 131 into a digital RGB data, for example, at gradation levels of 12 bits, and an image memory 139 including a RAM for storing the RGB data outputted from the A/D converter 138. This image memory 139 is comprised of three sections for the three color components of R, G, B, and stores the RGB data of each frame pixel by pixel at an address designated by an unillustrated address controller for the respective color components R, G, B. For example, the number of the pixels forming the image of each frame is 6291456 (3072×2048).

The image data processing unit 20 includes a table memory 21 in which an editing information such as layouts and print magnifications of the images of the respective frames to be exposed and other pieces of information, a processing device 22 adapted to read the RGB data stored in the image memory 139 and apply a specified processing such as compression, expansion or address designation for allotment thereto based on the editing information of the table memory 21, and having a film characteristic converting device 221, a gamma converting device 222 and an image processing device 220 (see FIG. 2), and a processed image memory 23 for storing the RGB data of the frame to be exposed in memory areas corresponding to the respective color components R, G, B in accordance with the specified processing applied in the processing device 22, and a line buffer 24 for temporarily storing one line of the RGB data of the image to be exposed.

The image exposing unit 30 includes an exposure controller 35 for driving the exposure head to be described later, the exposure head 33 driven by the exposure controller 35, and a printing sheet feeder 32 for feeding an elongated printing sheet 31 wound on a roll R. The printing sheet feeder 32 is provided with each roller 321, 322 and a drive motor 323. The exposure head 33 is adapted to output the RGB data onto the printing sheet 3 after converting it into a light signal. An exposure head controller 34 controls the driving of the exposure head 33. The exposure controller 35 synchronously controls the printing sheet feeder 32 and the exposure head controller 34 based on the RGB data of the three color components R, G, B sent from the line buffer 24, so that the image of each frame is precisely exposed to the printing sheet 31 for the respective colors R, G, B.

The developing unit 40 is provided with a liquid tank 41 filled with a developing solution. The printing sheet 31 exposed by the exposure head 33 is fed by an unillustrated exposed sheet feeder arranged downstream of the liquid tank 41 to be immersed in the developing solution in the liquid tank 41, whereby a latent image formed by the exposure to the printing sheet 31 is developed.

The cutting unit 50 includes a cutter 51 for cutting the printing sheet 31 dried after being developed in the developing unit 40 along widthwise direction, thereby dividing the printing sheet 31 fed to the cutting unit 50 by an unillustrated developed printing sheet feeder arranged upstream from the cutter 51 into frames. Cutter 51 is provided with an upper sword 511, a lower sword 512, a drive motor 513 and a cutter controller 514.

The system controller 60 includes an unillustrated CPU and a ROM storing a control program, and centrally controls the operations of the respective controllers by giving commands to them in accordance with this control program.

FIG. 2 is a construction diagram of an essential portion of a processing device 22. The processing device 22 is provided with film characteristic converting device 221 for reading the RGB data of 12 bits stored in the image memory 139, applying an image correction conforming to the characteristic of the film 11 to the read RGB data, and converting the RGB data into a RGB data of, e.g., 16 bits; the gamma converting device 222 for applying a gradation conversion to the RGB data of 16 bits obtained by the film characteristic converting device 221 to convert it into a RGB data of, e.g., 8 bits; and the image processing device 220 for giving a density correction amount to the gamma converting device 222. It should be noted that the processings by the film characteristic converting device 221, the gamma converting device 222 and the image processing device 220 are executed before the compression or expansion of the RGB data or the address designation for allotment.

Figure 3A:
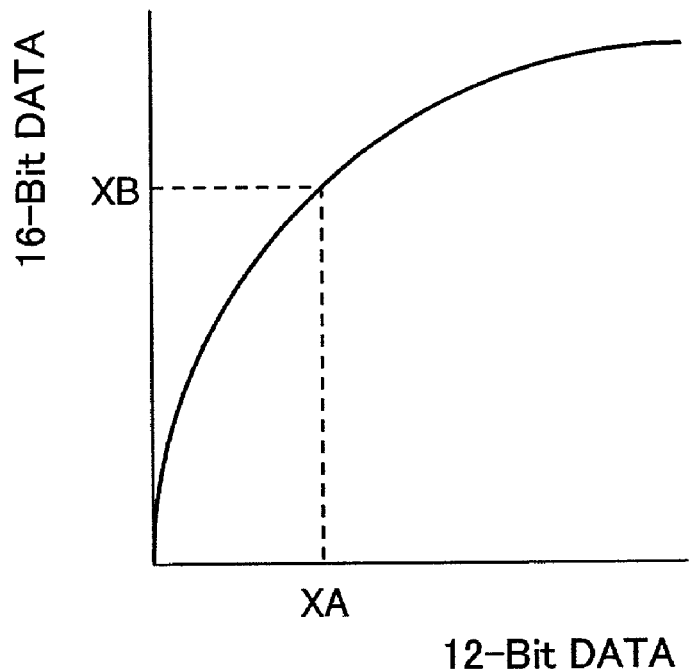
FIGS. 3A and 3B are graphs showing processings performed by a film characteristic converting device and a gamma converting device.
Figure 3B:
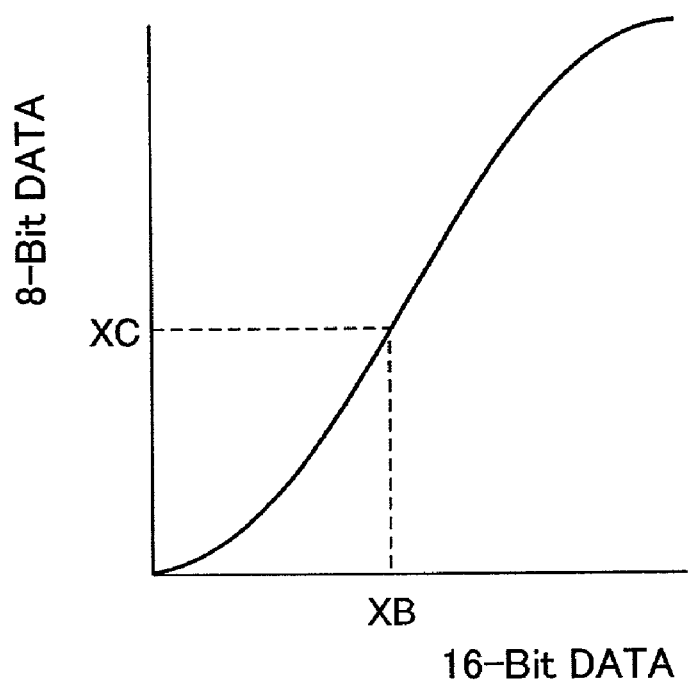

FIGS. 3A and 3B are graphs summarily showing the processings performed by the film characteristic converting device 221 and the gamma converting device 222. FIG. 3A is a graph summarily showing the processing performed by the film characteristic converting device 221. In this graph, horizontal axis represents the value of the RGB data of 12 bits which is an input to the film characteristic converting device 221, whereas vertical axis represents the value of the RGB data of 16 bits which is an output from the film characteristic converting device 221. For example, if the value of the RGB data of 12 bits is XA, the RGB data is converted into a RGB data of 16 bits whose value is XB by the film characteristic converting device 221.

FIG. 3B is a graph summarily showing the processing performed by the gamma converting device 222. In this graph, horizontal axis represents the value of the RGB data of 16 bits which is an input to the gamma converting device 222, whereas vertical axis represents the value of the RGB data of 8 bits which is an output from the gamma converting device 222. For example, if the value of the RGB data of 16 bits is XB, the RGB data is converted into a RGB data of 8 bits whose value is XC by the gamma converting device 222. The above processings by the film characteristic converting device 221 and the gamma converting device 222 are performed, for example, according to a table lookup method.

FIG. 4 is a graph summarily showing the processing performed by the image processing device 220. In this graph, horizontal axis represents the value of the RGB data of 16 bits which is an input to the gamma converting device 222, whereas vertical axis represents the value of the RGB data of 8 bits which is an output from the gamma converting device 222. A standard curve GA is a curve centered on a reference point CA for determining a conversion condition in the case that the density correction is not applied. If the standard curve GA is selected by the image processing device 220, an output range of the RGB data of 8 bits in relation to an input range RI of the RGB data of 16 bits is a standard output range ROA.

A low-density curve GB is a curve centered on a reference point CB for determining the conversion condition in the case of applying such a density correction as to reduce the density. If the low-density curve GB is selected by the image processing device 220, the output range of the RGB data of 8 bits in relation to the input range RI of the RGB data of 16 bits is a low-density output range ROB. A high-density curve GC is a curve centered on a reference point CC for determining the conversion condition in the case of applying such a density correction as to increase the density. If the high-density curve GC is selected by the image processing device 220, the output range of the RGB data of 8 bits in relation to the input range RI of the RGB data of 16 bits is a high-density output range ROC. It should be noted that the image processing device 220 applies the density correction by giving the position of the reference point of the curve for determining the conversion condition. In other words, the density correction is applied by selecting the density curve having a reference point of coordinate values obtained by subtracting a density correction amount ΔC to be described later from the coordinate values of the reference point CA of the standard curve GA. The density correction amount ΔC is added to the RGB data of 16 bits by the above processing.

Figure 5:
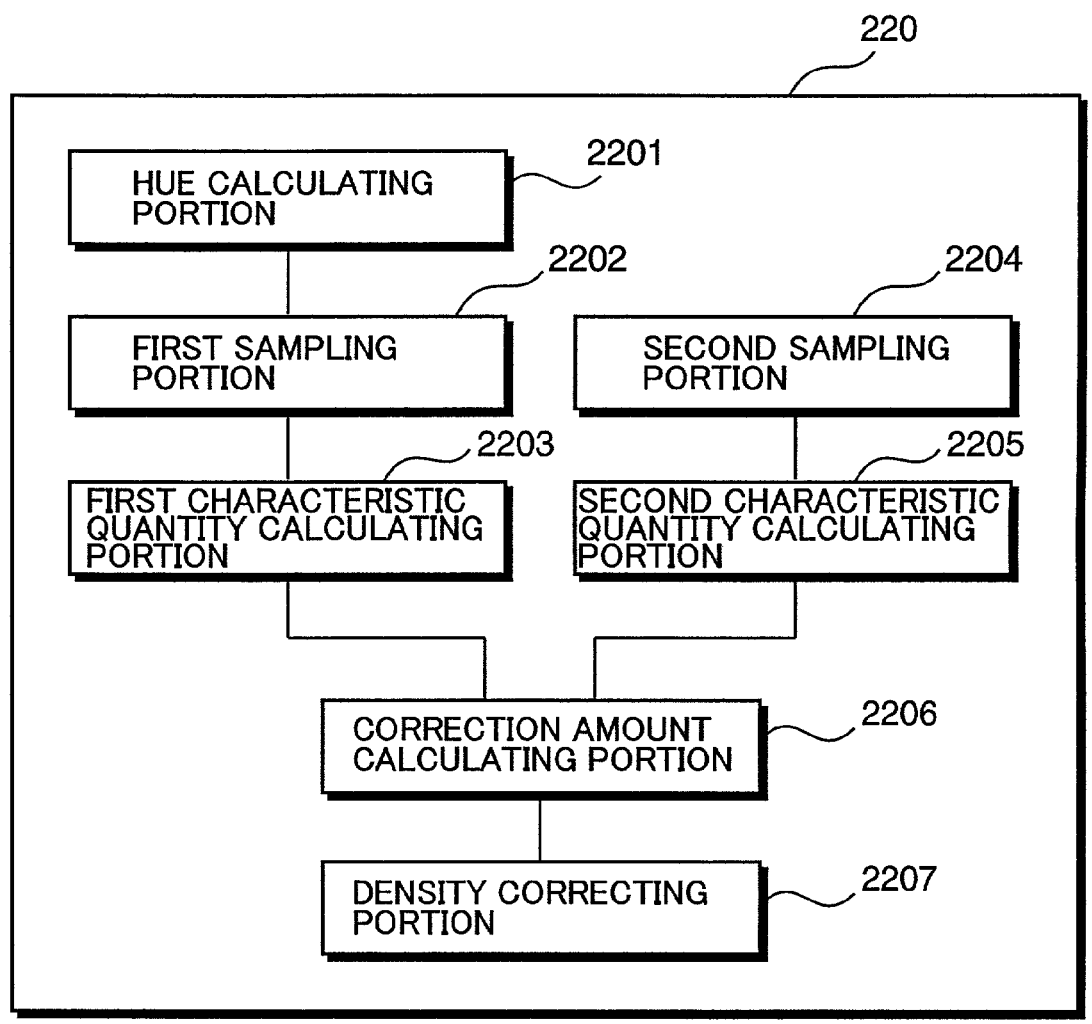
FIG. 5 is a block diagram of the image processing device.

FIG. 5 is a block diagram of the image processing device 220. The image processing device 220 includes a hue calculating portion 2201 for calculating a hue pixel by pixel based on the RGB data, a first sampling portion 2202 for sampling the pixels having a hue corresponding to the skin color from the RGB data, a first characteristic quantity calculating portion 2203 for calculating a first characteristic quantity representing a characteristic of the RGB data of the pixels sampled by the first sampling portion 2202, a second sampling portion 2204 for sampling the pixels located in the central part of an image area, a second characteristic quantity calculating portion 2205 for calculating a second characteristic quantity representing a characteristic of the RGB data of the pixels sampled by the second sampling portion 2204, a correction amount calculating portion 2206 for calculating the density correction amount using the first and second characteristic quantities, and a density correcting portion 2207 for correcting the density of the RGB data using the density correction amount.

The hue calculating portion 2201 selects the standard curve GA shown in FIG. 4, converts the RGB data of 8 bits outputted from the gamma converting device 222 into data Y, C1, C2 by Equation (1-1) and calculates a hue (Hue) by Equation (1-2). Here, the data Y represents a luminance, and the data C1, C2 represent colors.

$$\begin{bmatrix} Y \\ C1 \\ C2 \end{bmatrix} = \begin{bmatrix} 0.333 & 0.333 & 0.333 \\ -0.134 & 0.500 & -0.366 \\ 0.500 & -0.134 & -0.366 \end{bmatrix} \begin{bmatrix} R \\ G \\ B \end{bmatrix} \quad (1\text{-}1)$$

$$Hue = \tan^{-1}(C1/C2) \quad (1\text{-}2)$$

Figure 6:
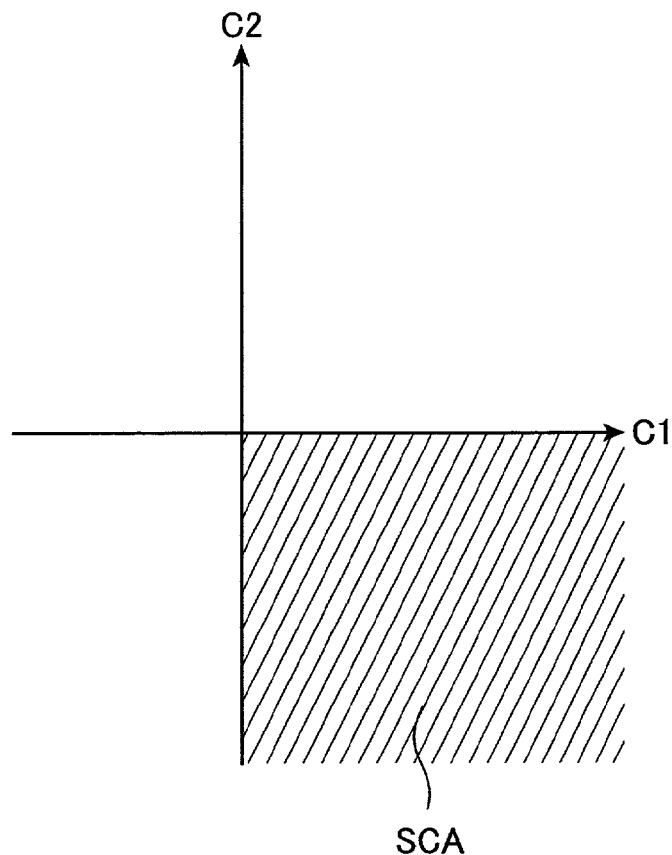
FIG. 6 is a graph showing areas of data C1, C2 of pixels sampled by a first sampling portion.

The first sampling portion 2202 samples the pixels, the values of which hues calculated by the hue calculating portion 2201 lie within a specified range (here, 270° to 360°). FIG. 6 is a graph showing an area of the data C1, C2 of the pixels sampled by the first sampling portion 2202. In this graph, horizontal axis represents the value of the color C1, whereas vertical axis represents the value of the color C2. Here, the pixels whose coordinate points corresponding to the data C1, C2 exist in a fourth quadrant SCA which is an area where the value of the hue is 270° to 360° are sampled. In other words, the pixels, the values of which C1 data are positive and the values of which C2 data are negative, are sampled.

The first characteristic quantity calculating portion 2203 calculates a deviation of a histogram whose horizontal axis represents the value of the RGB data and whose vertical axis represents the number of the pixels from an average value DEFC of the RGB data of a standard photographed image as a first characteristic quantity for the RGB data of 12 bits corresponding to the pixels sampled by the first sampling portion 2202 (RGB data stored in the image memory 139).

Specifically, a value of a parameter PA1 for each color defined by Equation (2-1) is calculated based on a value "i" (0 to 4095) of the RGB data of 12 bits, the number hist[i] of the pixels whose RGB data value is "i", and an average value DEFC (e.g., 1000) of the RGB data of the standard photographed image. The value of the parameter PA1 is a quantified value of a degree of deviation of the histogram whose horizontal axis represents the value of the RGB data and whose vertical axis represent the number of the pixels from the average value DEFC of the RGB data of the standard photographed image. Here, "2" is selected as an exponent of (i−DEFC) in Equation (2-1) in order to corresponding to the recognition of differences by human visual sensation.

Next, a parameter PA2 defined by Equation (2-2) is calculated for a color having a maximum value of the parameter PA1 (i.e., color whose histogram is most skewed). The value of the parameter PA2 is a quantified value of a degree of deviation of a histogram whose horizontal axis represents the value of the RGB data and whose vertical axis represent the number of the pixels from the average value DEFC of the RGB data of the standard photographed image and a direction of deviation. In order to let the parameter PA2 represents the direction of deviation, an exponent of (i−DEFC) in Equation (2-2) needs to be an odd number. Here, since "2" is selected as the exponent of (i−DEFC) in Equation (2-1), "3" is selected as the exponent of (i−DEFC) in Equation (2-2). The first characteristic quantity T1 is calculated by Equation (2-3) using the values of the parameters PA1 and PA2. In other words, the first characteristic quantity T1 is a characteristic quantity representing a direction of deviation and a degree of deviation of the color component having a maximum degree of deviation.

$$PA1 = \sum_{i=0}^{4095} \{(i - DEFC)^2 \times hist[i]\} \quad (2\text{-}1)$$

$$PA2 = \sum_{i=0}^{4095} \{(i - DEFC)^3 \times hist[i]\} \quad (2\text{-}2)$$

$$Y1 = PA2/PA1 \quad (2\text{-}3)$$

Figure 7:
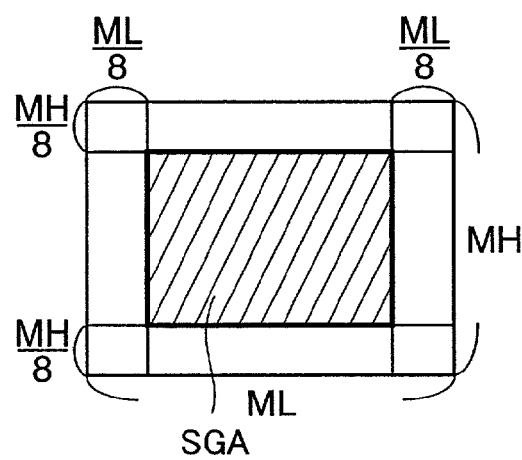
FIG. 7 is a diagram showing an exemplary range of pixels sampled by a second sampling portion.

The second sampling portion 2204 samples the pixels located in the central part of the image area since the main object is located in the central part of the image area in many cases. FIG. 7 is a diagram showing an exemplary range of pixels sampled by the second sampling portion 2204. Here, among pixels located in an image area having a vertical dimension MH and a horizontal dimension ML (i.e., among all the pixels), the second sampling portion 2204 samples the pixels located in a central area SGA hatched in FIG. 7 excluding specified areas extending a specified distance (e.g., distance MH/8) from the upper and bottom ends arid specified areas extending a specified distance (e.g., a distance ML/8) from the left and right ends.

The second characteristic quantity calculating portion 2205 calculates an average value of the R data corresponding to the skin color of a human figure assumed to be a main subject as a second characteristic quantity T2 for the RGB data of 12 bits (RGB data stored in the image memory 139) corresponding to the pixels sampled by the second sampling portion 2204.

The correction amount calculating portion 2206 normalizes a group of the first characteristic quantities and a group of the second characteristic quantities of the RGB data of a plurality of standard photographed images, applies Schmidt orthogonalization to the two normalized groups, and calculates a density correction amount by an equation defined by a factor obtained by normalizing the two orthogonalized groups again and variables comprised of the first and second characteristic quantities. A specific calculating method is described later with reference to a flowchart of FIG. 10.

The density correcting portion 2207 applies the density correction by adding the density correction amount calculated by the correction amount calculating portion 2206 to the RBG data. Specifically, the density correction is applied by selecting a density curve having a reference point at coordinates obtained by subtracting the density correction amount ΔC to be described later from the coordinates of the reference point CA of the standard curve GA shown in FIG. 4. By the above processing, the density correction amount ΔC is added to the RGB data of 16 bits.

FIG. 8 is a flowchart showing a procedure of operations performed by the image processing device 220. First, the hue (Hue) is calculated by the hue calculating portion 2201 (Step S1). Subsequently, the pixels having a hue corresponding to the skin color are sampled by the first sampling portion 2202 (Step S3). Then, the first characteristic quantity representing the characteristic of the RGB data of the pixels sampled by the first sampling portion 2202 is calculated by the first characteristic quantity calculating portion 2203 (Step S5).

Subsequently, the pixels located in the central part of the image area are sampled by the second sampling portion 2204 (Step S7). Then, the second characteristic quantity representing the characteristic of the RGB data of the pixels sampled by the second sampling portion 2204 is calculated by the second characteristic quantity calculating portion 2205 (Step S9). The density correction amount ΔC is calculated by the correction amount calculating portion 2206 using the first characteristic quantity calculated by the first characteristic quantity calculating portion 2203 and the second characteristic quantity calculated by the second characteristic quantity calculating portion 2205 (Step S11). Consequently, the density correction is applied to the RGB data by the density correcting portion 2207 using the density correction amount calculated by the correction amount calculating portion 2206 (Step S13).

FIG. 9 is a table showing a group of first characteristic quantities YS1 and a group of second characteristic quantities YS2 to which Schmidt orthogonalization is to be applied. Two groups to which Schmidt orthogonalization is to be applied are comprised of n pairs (n: at least $\geq 2$, for example n=212) of the first characteristic quantity YS1 and the second characteristic quantity YS2. The first characteristic quantity YS1 and the second characteristic quantity YS2 of the j-th pair are written $Ys_{1j}$, $YS_{2j}$, respectively. Here, it is assumed that the n pairs of the first characteristic quantity YS1 and the second characteristic quantity YS2 are obtained and stored in a storage means beforehand. The n pairs of the first characteristic quantity YS1 and the second characteristic quantity YS2 are calculated by applying the processing of Steps S1 to S9 of the flowchart shown in FIG. 8 to the RGB data of n standard photographed images.

It is further assumed here that average values $MID_i$, standard deviations $SIG_i$, an orthogonalization factor $b_{21}$, variances $V_1$, $V_2$ are calculated by applying the following processing to the n pairs of the first characteristic quantity YS1 and the second characteristic quantity YS2 shown in FIG. 9 and stored in the storage portion.

First, the n pairs of the first characteristic quantity YS1 and the second characteristic quantity YS2 are normalized. Specifically, the average values $MID_i$ (i=1, 2) are calculated by Equation (3-1); the standard deviations $SIG_i$ are calculated by Equation (3-2); and normalized characteristic quantities $YSN_{ij}$ (j=1, 2, ..., n) are calculated by Equation (3-3) using the average values $MID_i$ and the standard deviations $SIG_i$.

$$MID_i = \frac{1}{n}\sum_{j=1}^{n} YS_{ij} \ (i=1, 2) \tag{3-1}$$

$$SIG_i = \sqrt{\frac{1}{n-1}\left\{\sum_{j=1}^{n} YS_{ij}^2 - \left(\sum_{j=1}^{n} YS_{ij}\right)^2 / n\right\}} \ (i=1, 2) \tag{3-2}$$

$$YSN_{ij} = \frac{YS_{ij} - MID_i}{SIG_i} \ (i=1, 2, j=1, 2, \ldots, n) \tag{3-3}$$

Subsequently, the normalized characteristic quantities $YSN_{ij}$ are orthogonalized by Schmidt orthogonalization. Specifically, first characteristic quantities $XS_{1j}$ after the orthogonalization are calculated by Equation (4-1); the orthogonalization factor $b_{21}$ is calculated by Equation (4-2); and second characteristic quantities $XS_{2j}$ after the orthogonalization are calculated by Equation (4-3) using the first characteristic quantities $XS_{1j}$ after the orthogonalization and the orthogonalization factor $b_{21}$.

$$XS_{1j} = YSN_{1j} \ (j=1, 2, \ldots, n) \tag{4-1}$$

$$b_{21} = \frac{\sum_{j=1}^{n}(YSN_{1j} \times YSN_{2j})}{\sum_{j=1}^{n} YSN_{1j}^2} \tag{4-2}$$

$$XS_{2j} = YSN_{2j} - b_{21} \times XS_{1j} \ (j=1, 2, \ldots, n) \tag{4-3}$$

Then, variances for normalizing the characteristic quantities after the orthogonalization are calculated. Specifically, the variance $V_1$ of the first characteristic quantities $XS_{1j}$ is calculated by Equation (5-1) and the variance $V_2$ of the first characteristic quantities $XS_{1j}$ is calculated by Equation (5-2).

$$V_1 = \frac{1}{n}\sum_{j=1}^{n} XS_{1j}^2 \tag{5-1}$$

$$V_2 = \frac{1}{n-1}\sum_{j=1}^{n} XS_{2j}^2 \tag{5-2}$$

FIG. 10 is a flowchart showing a detailed processing of calculating the density correction amount in Step S11 of the flowchart of FIG. 8. The following operations are all performed by the correction amount calculating portion 2206.

First, the first characteristic quantity Y1 and the second characteristic quantity Y2 of the RGB data of the image to which the density correction is to be applied are normalized by Equation (6) to calculate the normalized characteristic quantities $YN_i$ (i=1, 2) (Step S15).

$$YN_i = \frac{Y_i - MID_i}{SIG_i} \quad (6)$$

Next, the normalized characteristic quantities $YN_i$ are orthogonalized by Schmidt orthogonalization by Equations (7-1), (7-2) to calculate the characteristic quantities $XS_i$ after the orthogonalization (Step S17).

$$X_1 = YN_1 \quad (7\text{-}1)$$

$$X_2 = YN_2 - b_{21} \times X_1 \quad (7\text{-}2)$$

The characteristic quantities after the orthogonalization are normalized by Equation (8) to calculate the characteristic quantities $XN_i$ after the normalization (Step S19).

$$XN_i = X_i / \sqrt{V_1} \quad (i=1, 2) \quad (8)$$

Next, a Schmidt's distance DS defined by Equation (9) is calculated using the characteristic quantities $XN_i$ after the normalization (Step S21).

$$DS = XN_1 + XN_2 \quad (9)$$

Then, the density correction amount $\Delta C$ is calculated by multiplying the Schmidt's distance DS by a specified constant $\beta$ if necessary (Step 23).

As described above, the influence factor of the first and second characteristic quantities Y1, Y2 on the density correction amount $\Delta C$ can be precisely set by using Schmidt orthogonalization, and this influence factor is determined based on the RGB data of the standard photographed images. Therefore, an operation of collecting data used to set the influence factor can be facilitated.

Next, the operation of the picture processing system is briefly described. First, in accordance with a command from the system controller 60, each image of the film 11 fed by the film feeder 12 of the RGB data reading unit 10 is read by the image sensing device 131 of the image reader 13 as three data by being separated into three color components of R, G, B, and the read data are stored in the image memory 139 after being converted into digital data by the A/D converter 138. At this time, the feed of the film 11 is controlled by the film-feed controller 123, the position of the optical filter 134 is successively switched by the filter-feed controller 136 so that the respective images can be read while being separated into three color components of R, G, B.

Subsequently, the pre-designated processing or the editing information such as the layout and print magnification of the image of the frame to be exposed to the printing sheet 31 is read from the table memory 21. The RGB data is read from the image memory 139 by the processing device 22 based on the designated processing or editing information and is processed or edited as the RGB data of the frame to be exposed, the image correction corresponding to the characteristic of the film 11 and the gradation conversion including the density correction are applied to the processed or edited RGB data, and the resulting processed RGB data is stored in the processed image memory 23. For the image of each frame, the RGB data stored in the processed image memory 23 as three image data obtained by separating the RGB data into three color components of R, G, B.

Subsequently, the RGB data of the frame to be exposed is read from the processed image memory 23 and is sent to the line buffer 24 line by line for the respective color components of R, G, B. The exposure controller 35 reads the RGB data line by line from the line buffer 24 for each color R, G, B, e.g., color B, and sends the read data of color B to the exposure head controller 34. The exposure head controller 34 causes a color-filter controller to rotate a disk-shaped color filter, so that a B-color area comes to a position where it faces a white light source. Further, the exposure head controller 34 controls the driving of a shutter array to expose the printing sheet 31.

The exposed printing sheet 31 is successively conveyed to the developing unit 40 to be developed by a specified developing solution and then conveyed to the cutting unit 50 after being dried. In the cutting unit 50, the printing sheet 31 is cut by the cutter 51 along its widthwise direction, thereby dividing an elongated stripe of the printing sheet 31 before the exposure into frames.

The present invention may be embodied as follows.

(A) Although the density correction amount is calculated by Schmidt orthogonalization in the foregoing embodiment, another method such as the multiple regression method or the discriminant analysis method may be used.

(B) Although the first characteristic quantity Y1 is calculated by Equations (2-1) to (2-3) in the foregoing embodiment, a method may be adopted according to which the first characteristic quantity Y1 is calculated using coordinates of an intersection of a straight line parallel with a vertical axis which divides a histogram whose horizontal axis represent the value of the RGB data and whose vertical axis represents the number of the pixels into two and the horizontal axis. In such a case, the processing is simpler.

As described above, an inventive picture image processing apparatus comprises an image storage portion for storing a RGB data pixel by pixel which data is obtained from a photographed film image while being separated into color components of R, G, B; a hue calculator for calculating a hue pixel by pixel based on the RGB data; a first sampling device for sampling pixels having a hue corresponding to a skin color from the RGB data; a first characteristic quantity calculator for calculating a first characteristic quantity representing a characteristic of the RGB data of the pixels sampled by the first sampling device; a second sampling device for sampling the pixels located in a central part of an image area; a second characteristic quantity calculator for calculating a second characteristic quantity representing a characteristic of the RGB data of the pixels sampled by the second sampling device; a correction amount calculator for calculating a density correction amount using the first and second characteristic quantities; and a density corrector for applying a density correction to the RGB data using the density correction amount.

With the picture image processing apparatus, the density correction is applied based on the characteristic quantity of the RGB data of the pixels having the hue corresponding to the skin color of a human figure which is a main subject and the characteristic quantity of the RGB data of the pixels having a high possibility of including the human figure. Therefore, the density of the human figure as the main subject can be properly corrected.

Preferably, the correction amount calculator normalizes a group of the first characteristic quantities and a group of the second characteristic quantities of the RGB data of a plurality of standard photographed images, applies Schmidt orthogonalization to the normalized two groups, and calculates the density correction amount by an equation defined by a factor obtained by normalizing the orthogonalized two groups again and variables including the first and second characteristic quantities.

With the correction amount calculator, a density correction based on the standard photographed images is enabled and the density of the human figure as the main subject can be properly corrected.

Preferably, the first characteristic quantity calculator calculates a deviation of a histogram whose horizontal axis represents the value of the RGB data and whose vertical axis represents the number of the pixels from an average value of the RGB data of the standard photographed image as the first characteristic quantity.

With the first characteristic quantity calculator, the deviation of the RGB data of the pixels having the hue corresponding to the skin color of the human figure as the main subject from the RGB data of the standard photographed image can be calculated as the first characteristic quantity.

Preferably, the second characteristic quantity calculator calculates an average value of R data of the RGB data as the second characteristic quantity.

With the second characteristic quantity calculator, the characteristic quantity of the RGB data of the pixels having a high possibility of including the human figure as the main subject can be easily calculated.

Preferably, the density corrector applies the density correction by adding the density correction amount to the RGB data. With the density corrector, the density correction can be easily applied.

An inventive picture image processing method comprises a hue calculating step of calculating a hue for each pixel based on a RGB data obtained by separating a photographed film image into color components of R, G and B and stored pixel by pixel in a storage portion; a first sampling step of sampling the pixels having a hue corresponding to a skin color from the RGB data; a first characteristic quantity calculating step of calculating a first characteristic quantity representing a characteristic of the RGB data of the pixels sampled in the first sampling step; a second sampling step of sampling the pixels located in a central part of an image area; a second characteristic quantity calculating step of calculating a second characteristic quantity representing a characteristic of the RGB data of the pixels sampled in the second sampling step; a density correction amount calculating step of calculating a density correction amount using the first and second characteristic quantities; and a density correcting step of applying a density correction to the RGB data using the calculated density correction amount.

With the picture image processing method, the density correction is applied based on the characteristic quantity of the RGB data of the pixels having the hue corresponding to the skin color of a human figure which is a main subject and the characteristic quantity of the RGB data of the pixels having a high possibility of including the human figure. Therefore, the density of the human figure as the main subject can be properly corrected.

An inventive picture processing system comprises an above-mentioned inventive picture image processing apparatus and an image exposing apparatus including an image exposure head for exposing a printing sheet by converting a RGB data into a light signal. The picture processing system can realize a proper correction of the density of the human figure as the main subject.

This application is based on patent application No. 2001-172954 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A picture image processing apparatus, comprising:
   an image storage portion which stores RGB data pixel by pixel which data is obtained from a photographed film image while being separated into color components of R, G, B;
   a hue calculator which calculates a hue pixel by pixel based on the RGB data;
   a first sampling device which samples pixels having a hue corresponding to a skin color from the RGB data stored on the image storage portion;
   a first characteristic quantity calculator which calculates a first characteristic quantity representing a characteristic of the RGB data of the pixels sampled by the first sampling device;
   a second sampling device which samples the pixels located in a central part of an image area;
   a second characteristic quantity calculator which calculates a second characteristic quantity representing a characteristic of the RGB data of the pixels sampled by the second sampling device;
   a correction amount calculator which calculates a density correction amount using the first and second characteristic quantities; and
   a density corrector which applies a density correction to the RGB data using the density correction amount;
   wherein the correction amount calculator normalizes a group of the first characteristic quantities and a group of the second characteristic quantities of the RGB data of a plurality of standard photographed images, applies Schmidt orthogonalization to the normalized two groups, and calculates a density correction amount by an equation defined by a factor obtained by normalizing the orthogonalized two groups again and variables including the first and second characteristic quantities.

2. A picture image processing apparatus according to claim 1, wherein the first characteristic quantity calculator calculates a deviation of a histogram whose horizontal axis represents the value of the RGB data and whose vertical axis represents the number of the pixels from an average value of the RGB data of the standard photographed image as the first characteristic quantity.

3. A picture image processing apparatus according to claim 2, wherein the second characteristic quantity calculator calculates an average value of R data of the RGB data as the second characteristic quantity.

4. A picture image processing apparatus according to claim 3, wherein the density corrector applies the density correction by adding the density correction amount to the RBG data.

5. A picture processing system comprising:
   a picture image processing apparatus including:
      an image storage portion which stores RGB data pixel by pixel which data is obtained from a photographed film image while being separated into color components of R, C, B;
      a hue calculator which calculates a hue pixel by pixel based on the RCB data;
      a first sampling device which samples pixels having a hue corresponding to a skin color from the RGB data;
      a first characteristic quantity calculator which calculates a first characteristic quantity representing a characteristic of the RGB data of the pixels sampled by the first sampling device;

a second sampling device which samples the pixels located in a central part of an image area;

a second characteristic quantity calculator which calculates a second characteristic quantity representing a characteristic of the RGB data of the pixels sampled by the second sampling device;

a correction amount calculator which calculates a density correction amount using the first and second characteristic quantities; and a density corrector which applies a density correction to the RGB data using the density correction amount; and an image exposing apparatus including an image exposure head for exposing a printing sheet by converting a RGB data into a light signal;

wherein the correction amount calculator normalizes a group of the first characteristic quantities and a group of the second characteristic quantities of the RGB data of a plurality of standard photographed images, applies Schmidt orthogonalization to the normalized two groups, and calculates a density correction amount by an equation defined by a factor obtained by normalizing the orthogonalized two groups again and variables including the first and second characteristic quantities.

6. A picture processing system according to claim 5, wherein the first characteristic quantity calculator calculates a deviation of a histogram whose horizontal axis represents the value of the RGB data and whose vertical axis represents the number of the pixels from an average value of the RGB data of the standard photographed image as the first characteristic quantity.

7. A picture processing system according to claim 6, wherein the second characteristic quantity calculator calculates an average value of R data of the RGB data as the second characteristic quantity.

8. A picture processing system according to claim 7, wherein the density corrector applies the density correction by adding the density correction amount to the RGB data.

* * * * *